(12) United States Patent
Perkins et al.

(10) Patent No.: US 9,988,144 B2
(45) Date of Patent: Jun. 5, 2018

(54) STEERING DEVICE FOR AN AIRCRAFT

(71) Applicant: AIRBUS OPERATIONS LIMITED, Bristol (GB)

(72) Inventors: Christopher Perkins, Bristol (GB); Nick White, Bristol (GB); Stuart Alexander, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 272 days.

(21) Appl. No.: 15/074,810

(22) Filed: Mar. 18, 2016

(65) Prior Publication Data

US 2016/0272307 A1 Sep. 22, 2016

(30) Foreign Application Priority Data

Mar. 20, 2015 (GB) .................................... 1504783.0

(51) Int. Cl.
*B64C 25/50* (2006.01)
*B64C 25/10* (2006.01)
*B64C 25/34* (2006.01)

(52) U.S. Cl.
CPC .............. *B64C 25/50* (2013.01); *B64C 25/10* (2013.01); *B64C 25/34* (2013.01)

(58) Field of Classification Search
CPC ......... B64C 25/10; B64C 25/50; B64C 25/34; B64C 25/44
USPC ......................................................... 244/50
See application file for complete search history.

(56) References Cited

U.S. PATENT DOCUMENTS

| | | | | |
|---|---|---|---|---|
| 2,543,233 A | | 2/1951 | Dowty | |
| 2,650,782 A | * | 9/1953 | Fehring | B64C 25/505 180/432 |
| 2,919,084 A | * | 12/1959 | Lovell | B64C 25/50 244/50 |
| 2,958,481 A | * | 11/1960 | Price | B64C 25/505 180/432 |
| 4,172,571 A | * | 10/1979 | Bowdy | B64C 25/50 114/150 |
| 4,948,069 A | * | 8/1990 | Veaux | B64C 25/50 244/102 R |
| 5,242,131 A | * | 9/1993 | Watts | B64C 25/34 180/432 |

(Continued)

FOREIGN PATENT DOCUMENTS

DE 10319448 A1 11/2004
GB 798866 A 7/1958

(Continued)

*Primary Examiner* — Justin M Benedik
(74) *Attorney, Agent, or Firm* — Hauptman Ham, LLP

(57) ABSTRACT

A steering device for an aircraft landing gear leg including a main fitting has a steering collar for rotatably mounting on the outside of the main fitting; an actuator having an actuator body; and an actuator arm arranged to move between an extended position and retracted position with respect to the actuator body. The actuator arm is pivoted to the main fitting, and a bracket is pivoted to the main fitting; a second pivot location pivoted to the actuator body; and a third pivot location pivotally connected to one end of a steering arm. The steering arm is pivoted at its other end to the steering collar. Also, an aircraft landing gear with the steering device and aircraft having the landing gear.

20 Claims, 6 Drawing Sheets

(56) References Cited

U.S. PATENT DOCUMENTS 5,362,015 A * 11/1994 Derrien .................. B64C 25/50
                                                              244/50
2012/0187239 A1* 7/2012 Martin .................... B64C 25/26
                                                              244/50

FOREIGN PATENT DOCUMENTS

GB            808438 A      2/1959
GB            901836 A      7/1962

* cited by examiner

STEERING DEVICE FOR AN AIRCRAFT

RELATED APPLICATIONS

The present application claims priority from Great Britain Application Number 1504783.0, filed Mar. 20, 2015, the disclosure of which is hereby incorporated by reference herein in its entirety.

FIELD OF THE INVENTION

The present invention relates to steering systems for aircraft landing gear more particularly to steering devices fitted to a landing gear leg, which rotate an axle carrying a wheelset or similar at the lower end of the landing gear leg.

BACKGROUND OF THE INVENTION

Aircraft landing gear typically comprise a strut which may be fixed or retractable, and sprung or un-sprung: sprung landing gear commonly comprising an oleo strut together with torque links. The upper end of the strut is mounted to the main aircraft structure and an axle is mounted at the lower end of the strut, which may carry a wheel arrangement or any other arrangement e.g. skis, or any combination thereof, requiring steering in order to change direction of the aircraft on the ground. The aircraft may be fixed wing, for example military, commercial or an unmanned aerial vehicle (UAV); or rotary wing for example helicopters fitted with wheels.

The strut has a lower end able to rotate with respect to the upper end about a central longitudinal axis, such that the steering device acts to rotate the lower end of the strut, and hence the wheel carrying axle, in order to steer the aircraft. The steering arrangement may include a self-centring device to return the steering to the centred, straight ahead position once the applied steering torque is released. There may also be a lock out or steering disengagement system, for example via a lock out pin or control from the flight deck. Such a landing gear design may be located at the nose, within the aircraft body or be the main landing gear of the aircraft.

Steering systems for aircraft typically have control from the flight deck via a wheel, tiller or joystick, with mechanical, electrical or hydraulic connections transmitting the controller input movement to a steering control unit. The control unit is commonly a hydraulic metering or control valve, which directs hydraulic fluid under pressure to one or more actuators designed with various linkages to rotate the lower end of the strut or slider of the landing gear leg. Actuator designs vary and, as well as hydraulic actuators, electro-hydraulic actuators (EHA) and electro-mechanical actuators (EMA) are commonly used on aircraft.

Known steering systems have fixed actuators acting on a collar connected via a torque link to the wheel axle. When in operation, the extension or retraction of the actuator arm can lead to the actuator swinging to large angles about its pivot and require large areas of clearance in order to avoid clashes with other parts of the landing gear structure. As a result, the steering device can require a large design space and the maximum achievable steering angle can be constrained. In addition, the size of the device and in particular the actuator size has weight implications, and it is desirable for the steering device to be as small and lightweight as possible.

SUMMARY OF THE INVENTION

A first aspect of the invention provides a steering device for an aircraft landing gear having a leg including a main fitting, the steeling device comprising a steering collar for rotatably mounting on the outside of the main fitting, at least one actuator having an actuator body and an actuator arm arranged to move between an extended position and a retracted position with respect to the actuator body, the actuator arm having a distal end for pivotal connection to the main fitting, a bracket having a first pivot location for pivotal connection to the main fitting, a second pivot location pivotally connected to the actuator body, and a third pivot location pivotally connected to one end of a steering arm, the steering arm is pivotally connected at its other end to the steering collar.

A second aspect of the invention provides an aircraft landing gear having a leg including a main fitting, and a steering device according to the first aspect, wherein the steeling collar is rotatably mounted on the outside of the main fitting, the distal end of the actuator arm is pivotally connected to the main fitting, and the bracket is pivotally connected to the main fitting at the first pivot location.

A third aspect of the invention provides an aircraft having the landing gear according to the second aspect.

The actuator may be pivotable about the second pivot location, art may have a longitudinal axis offset from the second pivot location.

An actuator is defined for the purposes of the present invention to mean a device that converts energy into motion and is responsible for moving or controlling a mechanism or system. The source of energy provided may include one or any combination of, for example, hydraulic, electric, mechanical or pneumatic.

An advantage of the claimed steering device is that it can actuate steering of the aircraft landing gear wheels or other ground contacting elements in a limited space without clashing or conflicting with any landing gear structure or hampering landing gear performance.

The present invention uses actuators mounted on a pivoting bracket connected via a steering arm to a steering collar. The actuators react against the main fitting to rotate the bracket and therefore the steering collar, allowing the wheels or other ground contacting elements to steer. As a result the pivoting bracket approximately follows the direction of the ground contacting elements, which reduces the swing of the actuators and hence the risk of clashing with the landing gear structure. The pivoting bracket may comprise plates which sandwich the actuator(s) whilst allowing the actuator(s) freedom to pivot and extend/retract as required. The pivoting bracket plates may have a plurality of pivotal mounting points and may also be connected via a web. The web may or may not be integrally formed with the plates.

As the actuators apply force, the pivoting bracket enables each actuator body to move with the steering collar and thereby pivot with the ground contacting elements. This contrasts with known systems where the actuators pivot about a fixed point and follow a path which requires both push and pull actuation. A further advantage of the claimed steering device is therefore that the required actuator torque curve is much flatter and hence actuators of a smaller size can be used, which then do not swing over such a large angle from a centre position. This requires a smaller space envelope and enables the device to be used in aircraft where space around the landing gear is constrained, or as a space saving system.

In the present invention, each actuator exerts either a push or pull force to effect steering in one direction. This enables the use of a single or a double acting actuator (depending on the number of actuators) and since a double acting actuator design may require change over valves, another advantage of the claimed steering device is that the need for a change over valve within the hydraulic system may be eliminated.

A yet further advantage is that it is also possible to use the device on landing gear systems which do have more space available, in order to achieve greater steering angles, and therefore provide improved manoeuverability on the ground. Typical landing gear steering angles can be up to around 80 degrees but may be less, e.g. up to 50 to 80 degrees, or may reach steering angles of above 90°, for example 95°. Where the steering device has to be located between the wheels, the achievable steering angle is likely to be more limited than if it can be raised higher up the landing gear leg.

The present invention may also provide for a steering arm connected between the steering collar and the pivoting bracket. This arm may be straight but may alternatively curve e.g. in order to approximately follow the contour of the landing gear leg. One end of the steering arm is located at the level of the steering collar and the other end lies at a height above the steering collar, such that the steeling collar and actuators lie in different transverse planes (i.e. approximately along the landing gear leg axis.) This enables the actuators to move without risk of clashing with the steering collar and a curved arm also enables the achievable steering angle to be maximised within a compact design. The steering device may include multiple steering arms pivotally connected to lugs located on the steering collar, and acting on one or more actuators.

The steering device may also include multiple actuators, which may be arranged side by side in the same transverse plane, or may be stacked one above the other following the axis of the landing gear leg. The ability to design a steering device capable of providing the required torque characteristic within a compact design space is thereby provided.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
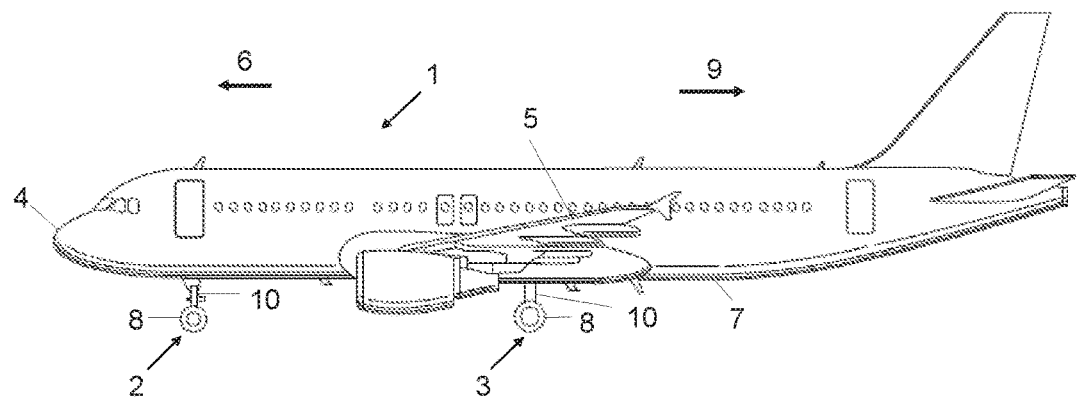
FIG. 1 is a side view of an aircraft.

FIG. 1 shows an aircraft 1 with a forward 6 and a backwards 9 direction of travel. Nose landing gear 2 is located at the aircraft nose 4 and main landing gears 3 are located at the wings 5. Alternative aircraft designs may include additional landing gear located on the body of the aircraft at the fuselage 7 or at the wings 5, or the gear may be at the tail of the aircraft. In FIG. 1 the nose landing gear 2 is steerable and the main landing gear 3 is fixed, however different aircraft have different steering configurations equally applicable to the embodiments described below, for example the main landing gear may be steerable with the nose landing gear free castoring, or all landing gear may be steerable. Any additional landing gear of alternative aircraft designs may equally be steerable or non-steerable.

The landing gears 2, 3 each comprise a leg 10 with an upper end for pivotal connection to the aircraft structure, in the case of the nose landing gear 2 to the aircraft fuselage 7 and for main landing gear 3 to the wing 5. An axle is mounted to the lower end of the leg 10, with a wheel arrangement 8 rotatably mounted on the axle. FIG. 1 shows each landing gear 2 and 3 having a diablo wheel arrangement, equally there may be a single wheel, three wheels or potentially any number of wheels mounted in combination with one or more axles.

Figure 2:
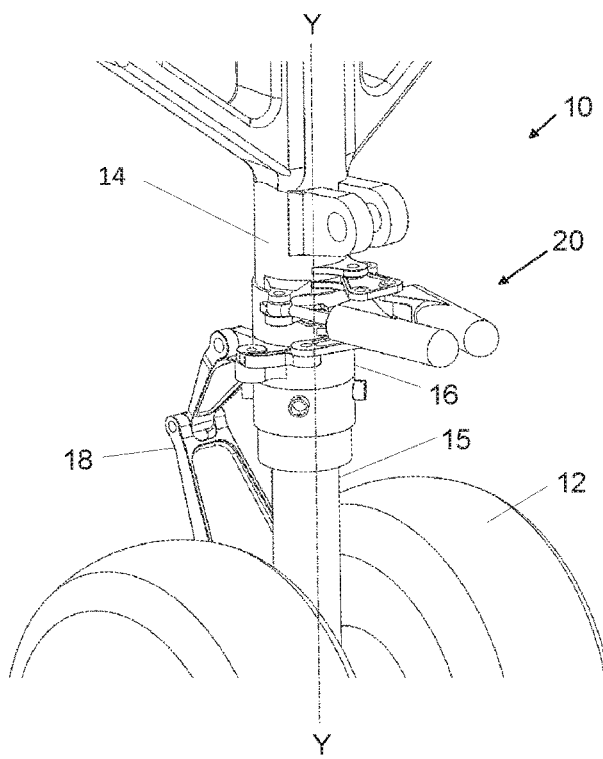
FIG. 2 is a schematic view of an aircraft landing gear having a first embodiment of e steering device.

FIG. 2 shows the landing gear leg 10 extending along axis Y-Y, which is substantially vertical when the aircraft is on the ground, but may be inclined at small angles, for example less than around 20°. The landing gear leg 10 comprises a main fitting 14 with an upper end pivotally connecting to the aircraft structure. The lower end of the landing gear leg 10 lies opposite the upper end and is connected to each wheel 12 of the wheel arrangement 8 via an axle (not shown). The landing gear leg 10 is telescopic and includes a slider 15 at its lower end able to slide axially and also rotate inside the main fitting 14.

The steering device 20 includes a steering collar 16 rotatably mounted on the outside of the main fitting 14 at its lower end. Torque links 18 are coupled between the steering collar 16 and the slider 15 such that the slider 15 rotates inside the main fitting as the steering collar rotates about the main fitting 14. The slider is mounted to the wheel axle or axles and rotation of the slider therefore results in rotation of the wheels to steer the aircraft.

Figure 3:
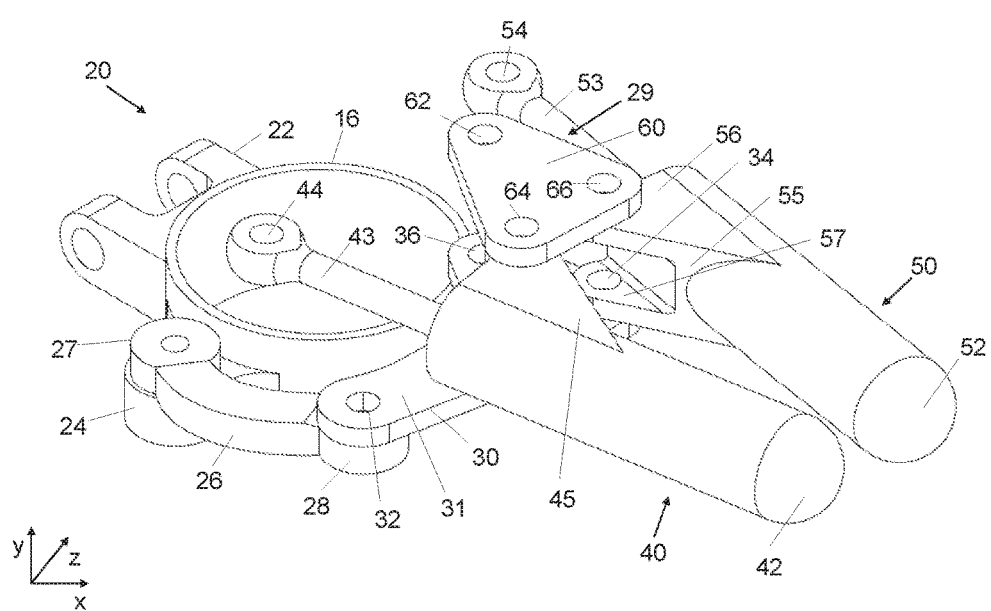
FIG. 3 shows an isometric view of the first embodiment of the steering device.
Figure 4:
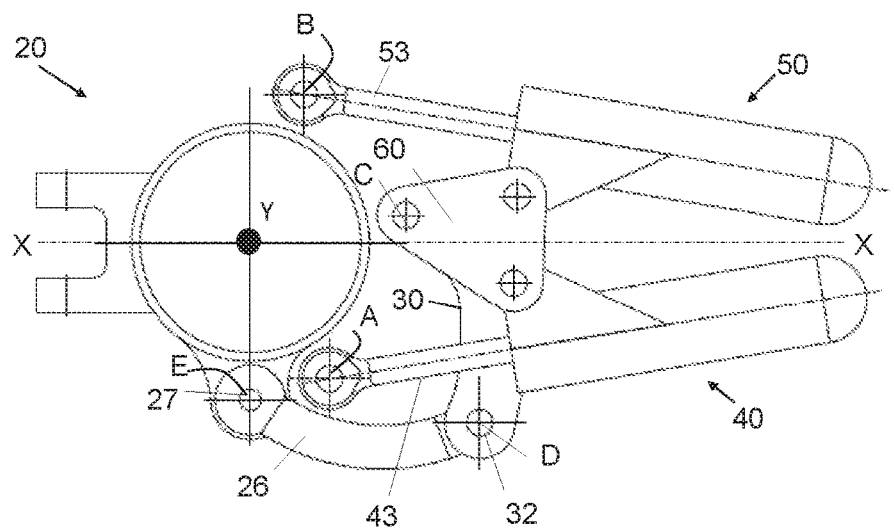
FIG. 4 shows a plan view of the first embodiment of the steering device.
Figure 5:
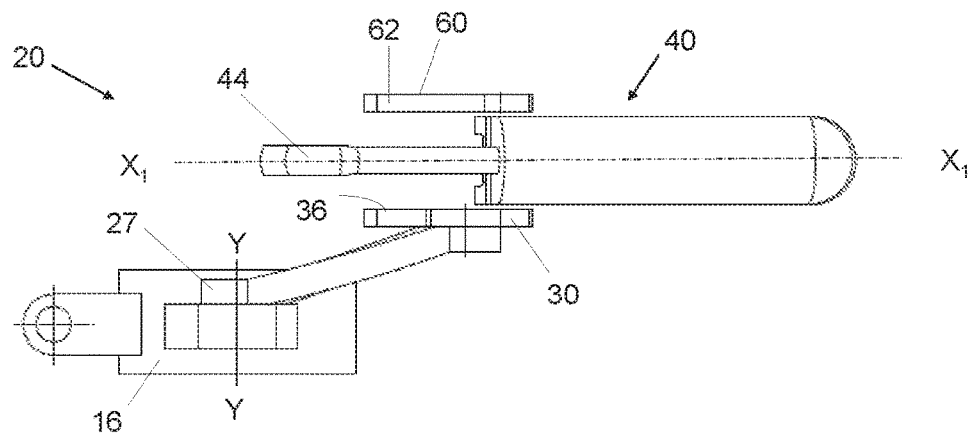
FIG. 5 shows a side view of the first embodiment of the steering device.

The steering device 20 of the first embodiment is shown as an isolated assembly in the isometric view of FIG. 3. FIG. 4 shows a plan view of the steering device and FIG. 5 shows a side view. The steering device 20 comprises the steering collar 16, a steering arm 26, a left actuator 40, a right actuator 50 as well as a bracket 29 comprising a lower plate 30 and an upper plate 60.

FIG. 3 shows lugs 22 for pivotally mounting the torque links 18 (shown in FIG. 2). The lugs 22 are located on the steering collar 16 at a position facing the forward direction of travel 6 (shown in FIG. 1) of the aircraft. In other embodiments, the lugs 22 could be positioned facing the backwards direction of travel 9 of the aircraft. The steering collar 16 also has a mounting lug 24 for pivotally mounting the steering arm 26. The mounting lug 24 is located approximately perpendicular to the torque link lugs 22 about the axis Y-Y, as shown in FIG. 4.

At each end the steering arm 26 has a pivotal mounting point 27, 28 and in this embodiment is a curved arm shaped to follow approximately the outer diameter of the steering collar 16. As shown in FIG. 5, the proximal end 27 of the steering arm 26 is located at the level of the steering collar 16, and the distal end 28 of the steering arm 26 lies at a height above the steering collar 16, thereby maximising the available space for the actuators to move. The steering arm may therefore form an approximately helical or spiral shape as it curves between its mounting points 27, 28. It may be curved when viewed from above, as shown in the plan view of FIG. 4. As shown in FIG. 5, the steering arm 26 may also form a curve when viewed from the side.

At its distal end 28 the steering arm 26 pivotally connects to the lower plate 30. The lower plate 30 is a substantially triangular shaped plate with a mounting point at each apex and with a bracket arm 31 extending beyond one of these mounting points to form a further pivotal mounting point 32 to the steering arm distal end 28. The lower plate extends from a pivotal mounting point at the main fitting 14 in a plane generally perpendicular to axis Y-Y.

Two actuators are located on the opposite side of the steering collar 16 to the torque link lugs 22, towards the rear of the aircraft and being arranged in a transverse plane containing axis X-X, as shown in FIG. 4. When viewed facing the front of the aircraft it can be seen that a left actuator 40 is positioned on one side of the transverse axis X-X and a right actuator 50 on the other side of the transverse axis X-X. The actuators lie asymmetrically about the transverse axis K-X when the steering device is centred, corresponding to the in-line and straight position of the wheels 12, alternatively the actuators may lie approximately equidistantly from the axis X-X when the steering device is centred.

The left actuator 40 comprises an actuator body 42 and actuator arm 43, and the right actuator 50 comprises an actuator body 52 and actuator arm 53. A left mounting flange 45 is attached to the left actuator body 42 and a right mounting flange 55 is attached to the right actuator body 52. Each mounting flange has upper and lower projections (in FIG. 3 these are only visible on the right actuator as parts 56 and 57). The projections on each mounting flange 45 and 55 face inwards towards the transverse axis X-X and each other. Each actuator is pivotally mounted to the lower plate via one of the lower plate mounting points (the right actuator lower plate mounting point 34 is shown in FIG. 3). The third lower plate mounting point 36 pivotally locates the lower plate 30 to a fixed main fitting lug (not shown).

An upper plate 60 is located above the actuators 40 and 50, and together with the lower plate acts to sandwich the actuators. Similarly to the lower plate 30, the upper plate 60 is substantially triangular in shape with a mounting point at each apex, but differs from the lower plate in that there is no additional bracket arm 31. The first mounting point 62 is pivotally connected to a fixed main fitting lug (not shown), and is located offset from axis X-X on the opposite side of X-X to the steering arm 26. The upper plate 60 is therefore not symmetrical in shape. The upper plate 60 pivotally locates the upper projection of the left actuator mounting flange 45 at a second mounting point 64. The upper plate 60 pivotally locates the upper projection 56 of the right actuator mounting flange 55 at a third mounting point 66.

Optionally, the upper and lower plates are set apart from each other in height along the axis Y-Y but are aligned to each other along the transverse axis X-X such that the upper plate mounting point 64 and the equivalent lower plate mounting point may be used to connect the left actuator 40 upper and lower mounting bracket projections via a single pivot pin. Equally the third upper plate mounting point 66 and equivalent lower plate mounting point may connect the right actuator 50 upper and lower mounting bracket projections via a single pivot pin, and the upper plate mounting point 62 and lower plate mounting point 36 may both connect to the same main fitting lug.

Each actuator is arranged such that the actuator arm moves between an extended and retracted position with respect to the actuator body. At its distal end the left actuator arm 43 has a mounting point 44 for pivotal connection to the main fitting; the right actuator arm 53 has an equivalent mounting point 54. The pivotal connection to the main fitting is located offset from the transverse axis X-X, with the left actuator arm pivotally mounted at point A located towards the left side of landing gear leg 10 and the right actuator arm pivotally mounted at point B located towards the right side of landing gear leg 10.

As can be seen from FIG. 4, the left 40 and right 50 actuators are separated from each other about the transverse axis X-X by the upper 60 and lower 30 plates. With the steering set straight ahead towards the front of the aircraft i.e. at zero degrees, the left 43 and right 53 actuator arms have a substantially equal extension. In this position the longitudinal axis of the left 40 and right 50 actuators is offset and angled with respect to axis X-X, the actuator longitudinal axes are divergent towards the main fitting by an internal angle which is approximately less than 45°, preferably less than 20°. This angle changes during steering.

The left 40 and right 50 actuators lie in the same transverse plane $X_1$-$X_1$ as shown in FIG. 5, which is generally perpendicular to the Y-Y axis of the landing gear leg 10 and is located above the steering collar 16. In addition to being pivotally mounted at the main fitting, each actuator is also pivotally mounted between the lower 30 and upper 60 plates, the left actuator at second mounting point 64 and the right actuator at third mounting point 66, enabling the actuators to pivot in plane $X_1$-$X_1$. In a further embodiment the actuators could be arranged stacked one above the other, following the axis Y-Y.

The actuators in this embodiment are dual acting and hydraulically operated. Other types of linear actuator well known in the art could be used for this application, such as EMA, EHA or pneumatic actuator designs. In an alternative embodiment the design could encompass single acting spring biased actuators.

The steering collar 16, steering arm 26, and lower 30 and upper 60 plates are manufactured from any suitable material and could be metal or a composite material, for example a carbon fibre composite. Metallic components are likely to be fabricated by casting or forging, such that the mounting points and lugs may or may not form an integral part of each component. This enables the shape of the part to be optimised for the space constraints of the application.

The steering device 20 as described forms three main pivot points with the main fitting 14. As can be seen in FIG. 4, Pivots A and B are formed via the left 43 and right 53 actuator arms at their respective distal ends 44 and 54. Pivot C exists via mounting points 36 and 62 located respectively on the lower plate 30 and on the upper plate 60. In this embodiment the lower plate 30 and the upper plate 60 have corresponding pivot points at C on the main fitting. Pivots A, B and C, together with the extension or retraction of the left 40 and right 50 linear actuators, act to rotate the steering collar 16 via the pivotal connection D of the bracket arm 31 to the steering arm 26 and via the pivotal connection E of the proximal end 27 of the steering arm 26 to the steering collar 16.

FIG. 6 demonstrates the position of the steering device 20 according to various exemplary steering angles and directions. FIGS. 6a-6c show the device rotating in an anticlockwise. direction when viewed from above, and FIGS. 6d-6f show clockwise rotation. FIG. 6a shows the steering device at zero degrees rotation about transverse axis X-X, with both actuators substantially equally extended at approximately the midpoint of the actuator arm extension. In order to rotate the steering collar 16 in an anticlockwise direction, the left actuator 40 is progressively extended and the right actuator 50 is progressively retracted, as shown in FIGS. 6b and 6c. As the left 43 and right 53 actuator arms move, their distal ends pivot about pivot points A and B respectively. Similarly, the lower 30 and upper 60 plates pivot at pivot point C, which is offset from axis X-X on the opposite of X-X to the steering arm 26. As a result, the lower 30 and the upper 60 plate, together with the actuators 40 and 50, rotate about their respective pivot points. The rotation of the bracket arm 31 about pivot C exerts a force on the steering arm 26 and causes the steering arm 26 to move whilst also pivoting about both its end mounting points D and E. The action of the steering arm 26 in turn rotates the steering collar 16 via mounting lug 24.

Figure 6C:
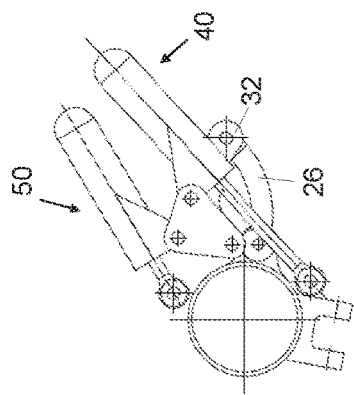
FIGS. 6a-6f show how the steering device operates to provide rotation at various angles and directions.

FIG. 6c shows the steering device 20 at its maximum rotation, with left actuator 40 at its maximum extension and the right actuator 50 at its maximum retraction. The angle between the bracket arm 31 and the steering arm 26 at the mounting point 32 is acute and both arms are being pulled increasingly in line with each other until a maximum rotation of the steering collar 16 is reached at about 80 degrees.

Figure 6F:
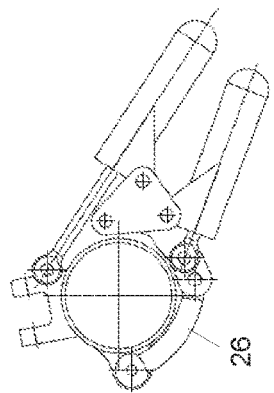
Figure 6B:
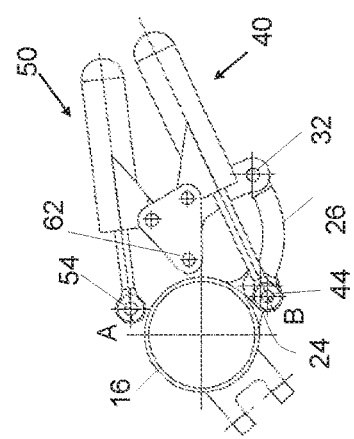
Figure 6E:
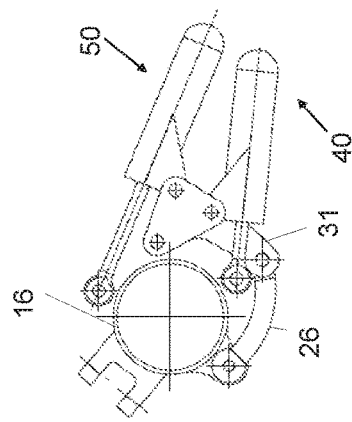
Figure 6A:
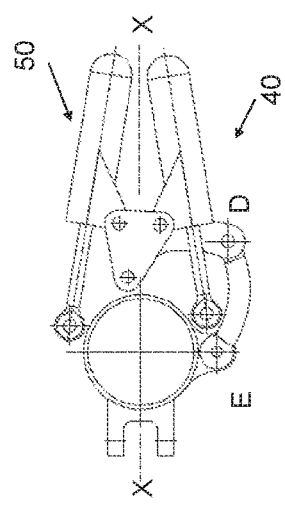
Figure 6D:
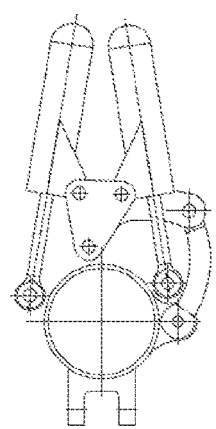

FIGS. 6e and 6f show how clockwise rotation of the landing gear leg is achieved. The left actuator 40 is progressively retracted and the right actuator 50 is progressively extended. The bracket arm 31 rotates towards the landing gear leg, thereby causing the steering arm 26 to move and the steering collar 16 to rotate clockwise about the main fitting. At maximum rotation in FIG. 6f, the curved steering arm 26 substantially follows the contour of the outer diameter of the steering collar and is located close to it, thus maximising the achievable steering angle without clashing or otherwise conflicting with any other component in the region of the steering device.

Figure 7:
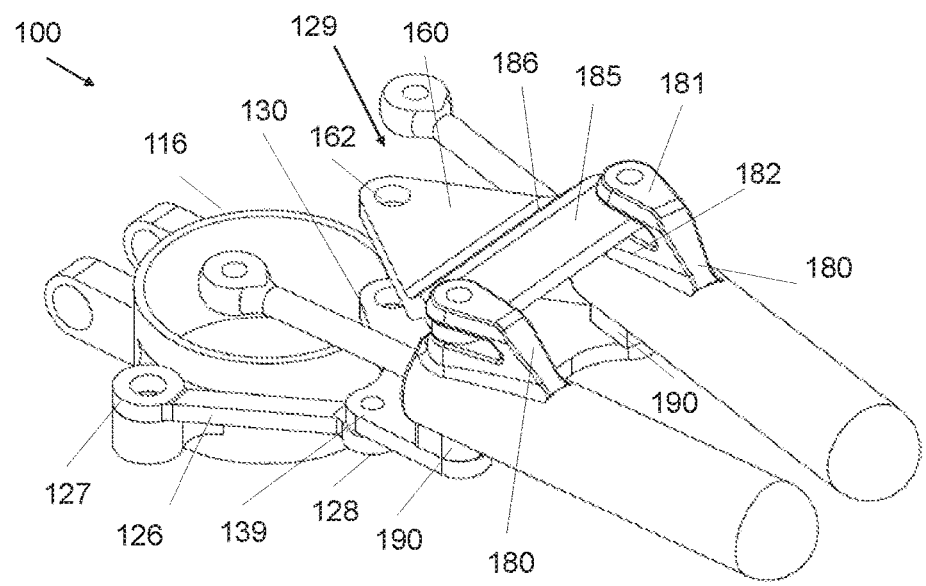
FIG. 7 shows an isometric view of a second embodiment of the steering device for the aircraft landing gear.

FIG. 7 shows an alternative embodiment of the steeling device, which may be attached to the landing gear leg of FIG. 2, as located on the aircraft of FIG. 1 or any of the alternative aircraft landing gear previously described. The steering device 100 comprises similar component parts to the previous illustrated embodiment, the reference numerals for which are incremented by 100 in FIG. 7 for ease for reference. The design of the actuators and the steering collar remains as in the previous embodiment and so will not be described further.

The steering arm 126 in FIG. 7 is substantially straight. Where the main limitation to steering angle is the conflict between the steering device and the wheels, for example where the steering device is located between the wheels, a straight steering arm may suffice, as a curved steering arm may not be able to achieve any greater steering angle. As in the previous embodiment, each end of the steering arm 126 has a pivotal mounting point, with the proximal end 127 of the steering arm 126 located at the level of the steering collar 116, and the distal end 128 of the steering arm 126 lying at a height above the steering collar 116, thereby maximising the available space for the actuators to move. Whilst a straight steering arm may reduce the achievable maximum steering angle, it may enable a more cost effective design and/or standardised components to be used.

In this embodiment, each actuator has an upper mounting flange 180 and a lower mounting flange 190. Each upper mounting flange 180 pivotally locates each actuator to the upper plate 160 of the bracket 129 via one of the upper plate mounting points. Each lower mounting flange 190 pivotally locates each actuator to the lower plate 130 via one of the lower plate mounting points. The upper and lower mounting flanges may be formed integrally with the actuator body.

The upper mounting flange 180 comprises an upper projection 181 and a lower projection 182, forming a clevis. The lower projection 182 is located on the upper surface of the actuator body and the upper projection 181 extends from the lower projection 182. The upper and lower projections may be formed as a single part and could, for example be cast integral to the actuator body or, for example, be welded to it. A section 185 of the upper plate 160 is pivotally located between the lower 182 and upper 181 projection of each upper mounting flange 180. The section 185 of the upper plate 160 may be located at a height above the first pivotal locating point 162 of the upper plate, which pivotally connects to a main fitting lug (not shown). The upper plate 160 in this embodiment is therefore similar to the first embodiment in that it is substantially triangular in shape with pivotal mounting points near each apex, but in addition has a step or ramp 186 to a raised section 185 to accommodate pivotally mounting the actuators at a different height to that of the main fitting 14. This step or ramp 186 enables the actuators to be raised as high as possible to minimise the risk of interference with the aircraft wheels, whilst allowing the mounting point 162 of the upper plate 160 to the main fitting to be lower, and thus optimises the use of space in designs where there are space constraints. Similarly to the first embodiment, the upper plate 160 may not be symmetrical in shape about a transverse axis running through the centre of the steering collar 116.

The lower plate 130 of the bracket 129 is pivotally connected to each of the lower mounting flanges 190 and to a pivotal mounting point at the main fitting 14. In this embodiment, the lower plate 130 is a substantially triangular shaped plate with a mounting point at each apex, and pivotally connects to the steering arm 126 via a lug 139 located on the lower plate 130.

The operation of the steering device 100 is similar to the first embodiment described previously, except that the achievable steering angle is limited by interference with the landing gear structure rather than the steering arm and hence the use of a substantially straight steering arm 126.

Figure 8:
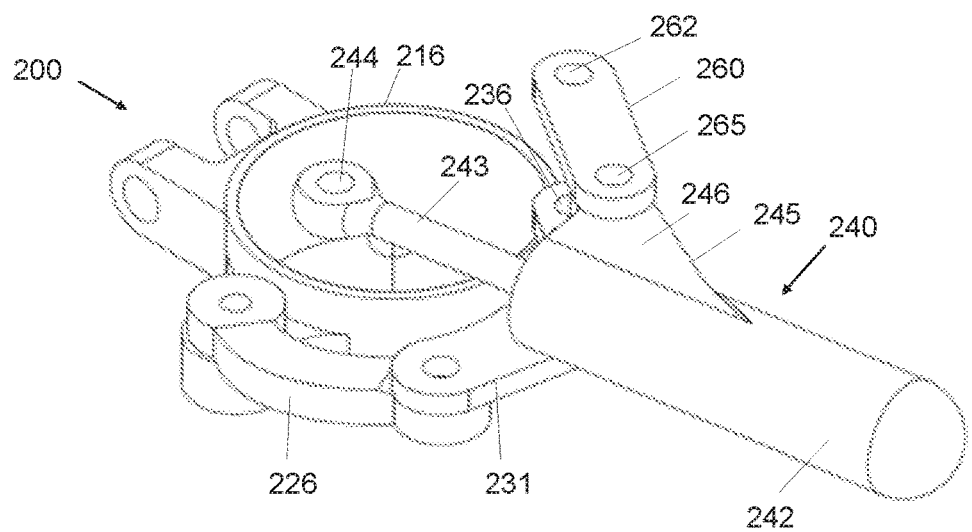
FIG. 8 isometric view of a third embodiment of the steering device for the aircraft landing gear.
Figure 9:
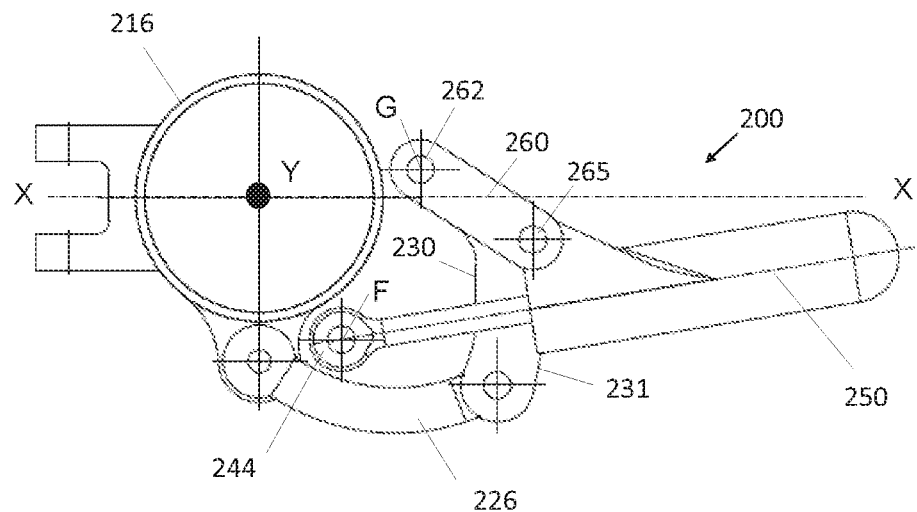
FIG. 9 shows a plan view of the third embodiment of the steering device.
Figure 10:
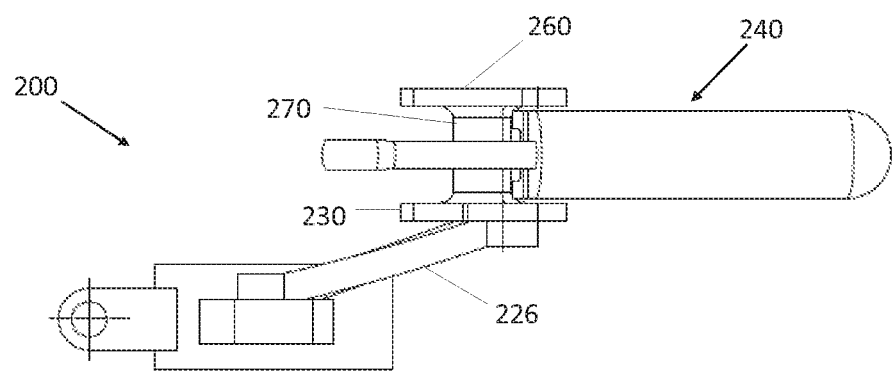
FIG. 10 shows a side view of the third embodiment of the steering device.

In a third embodiment shown in FIGS. 8 to 10, the steering device 200 may include a single actuator 240 to effect movement of the steering collar 216. The steering device may be attached to the landing gear leg of FIG. 2, as located on the aircraft of FIG. 1 or any of the alternative aircraft landing gear previously described herein. The steering collar 216 and steering arm 226 arrangement remains as in the first illustrated embodiments and so are not described in further detail, except to say that although the steering arm 226 shown in FIGS. 8 to 10 is curved, a straight steering arm according to the second embodiment above could alternatively be used.

Whilst the actuator 240 has an actuator body 242 and an actuator arm 243 similar to previous embodiments, a steering device with a single actuator requires a mechanism to return the actuator arm towards a neutral (in-line) position. The actuator in this embodiment is therefore dual acting and preferably hydraulically operated, although other types of linear actuator well known in the art could be used, e.g. EMA, EHA or pneumatic actuator designs. In an alternative embodiment the design could encompass a single acting spring biased actuator.

At its distal end, the actuator arm 243 has a mounting point 244 for pivotal connection to a main fitting lug (not shown). The actuator body 242 has a mounting flange 245 with upper and lower projections, only the upper projection 246 is visible in FIG. 8. Each projection has a mounting point, the lower projection mounting point pivotally connecting to a lower plate 230 (shown in FIG. 9) and the upper projection mounting point 265 pivotally connecting to an upper plate 260. The lower 230 and upper 260 plates may be connected via a plate web 270 as shown in FIG. 10, and may be formed as a single component.

The design of the mounting flange 245 shown in FIGS. 8-10 is similar to those of the first embodiment, However, the design of mounting flanges 180 and 190 shown in the second embodiment in FIG. 7 could equally well be used for the single actuator of this third embodiment, in combination with the upper 260 and lower 230 plates of the third embodiment.

At its proximal end the lower plate 230 has a bracket arm 231 extending to form a pivotal connection with the steering arm 226. At its distal end the lower plate 230 has a pivotal connecting point 236 to the main fitting. At an intermediate point along its length (not visible in FIGS. 8-10) the lower plate 230 has a pivotal connecting point to the actuator mounting bracket lower projection.

The upper plate 260 is a substantially straight, flat plate including two mounting points, one at its proximal end 265 pivotally connecting to the actuator mounting bracket upper projection 245 and one at its distal end 262 pivotally connecting to the main fitting. When the steering device is centred, corresponding to the inline and straight position of the wheels, the upper plate 260 lies across the axis X-X with each mounting point 262, 265 located on opposite sides of the X-X axis. The upper plate 260 may lie in a transverse plane X-X or may include a step or ramp and raised section similar to the upper plate 160 of the second embodiment above. Similarly to the second embodiment of FIG. 7, the step or ramp enables the actuators to be raised so as to minimise the risk of interference with the wheels.

When the steering device is centred, corresponding to the inline and straight position of the wheels, the longitudinal axis 250 of the actuator arm and body lies at an angle to the axis X-X shown in FIG. 9. Relative to axis X-X the actuator longitudinal axis 250 is divergent towards the main fitting by an internal angle which is approximately less than 45°, preferably less than 20°. This angle changes during steering. The mounting point 244 of the actuator arm to the main fitting is also located offset from the axis X-X. With a single actuator the operation of the steering device differs from that of the first and second embodiments. In order to rotate the steering collar 216 in an anticlockwise direction about axis Y-Y, the actuator arm extends. Pivot points F and G are fixed relative to the main fitting, and therefore the transverse distance between the actuator arm mounting point 244 at fixed pivot point F and upper plate pivotal mounting point 265 increases. The upper plate 260 pivots about its fixed connection point 262 (pivot point G) with the main fitting. The lower plate 230 also pivots about its fixed connection point 236 with the main fitting, with the bracket arm 231 acting on the steering arm 226 and causing the steering collar 216 to rotate anticlockwise. In order to return the steering collar 216 to the central, in-line position the actuator arm must be retracted, optionally by a spring bias in a single acting actuator or more preferably via the use of a dual acting actuator. As the actuator arm is retracted, the lower plate 230 pivots about the main fitting connection point 236 and the bracket arm 231 pivots, causing the steering arm 226 to rotate the steering collar 216 clockwise.

Although the invention has been described above with reference to one or more preferred embodiments, it will be appreciated that various changes or modifications may be made without departing from the scope of the invention as defined in the appended claims.

The invention claimed is:

1. A steering device for an aircraft landing gear having a leg including a main fitting, the steering device comprising a steering collar for rotatably mounting on the outside of the main fitting, at least one actuator having an actuator body and an actuator arm arranged to move between an extended position and retracted position with respect to the actuator body, the actuator arm having a distal end for pivotal connection to the main fitting, a bracket having a first pivot location for pivotal connection to the main fitting, a second pivot location pivotally connected to the actuator body, and a third pivot location pivotally connected to one end of a steering arm, the steering arm is pivotally connected at its other end to the steering collar.

2. A steering device according to claim 1, wherein the actuator is pivotable about the second pivot location.

3. A steering device according to claim 1, wherein the steering arm is straight.

4. A steering device according to claim 1, wherein the steering arm is curved.

5. A steering device according to claim 1, wherein the actuator has a longitudinal axis offset from the second pivot location.

6. A steering device according to claim 1, wherein the actuator is dual acting.

7. A steering device according to claim 1, wherein the steering collar has a lateral lug and the steering arm is pivotally connected to the lug.

8. A steering device according to claim 1, wherein the bracket includes at least two plates which sandwich the actuator.

9. A steering device according to claim 8, wherein the bracket plates are connected by a web.

10. A steering device according to claim 1, comprising a plurality of the actuators, each actuator having an actuator body pivotally connected at a respective second pivot location to the bracket.

11. A steering device according to claim 10, wherein the actuators are arranged side by side.

12. A steering device according to claim 10, wherein the actuators are arranged stacked one above the other.

13. An aircraft landing gear having a leg including a main fitting, and a steering device according to claim 1, wherein the steering collar is rotatably mounted on the outside of the main fitting, the distal end of the actuator arm is pivotally connected to the main fitting, and the bracket is pivotally connected to the main fitting at the first pivot location.

14. An aircraft landing gear according to claim 13, wherein the main fitting has an upper end for pivotal connection to an aircraft structure, and a lower end opposite the upper end, and the steering collar is rotatable mounted at the lower end of the main fitting.

15. An aircraft landing gear according to claim 13, wherein the leg is telescopic and includes a slider axially slidable inside the main fitting.

16. An aircraft landing gear according to claim 15, further comprising torque links coupled between the steering collar and the slider such that the slider rotates inside the main fitting as the steering collar rotates about the main fitting.

17. An aircraft landing gear according to claim 13, wherein the leg carries an axle at a lower end thereof and one or more wheels are rotatably mounted on the axle.

18. An aircraft landing gear according to claim 13, wherein the main fitting has a plurality of lugs, and the distal end of the actuator arm and the bracket are pivotally connected to the lugs of the main fitting.

19. An aircraft landing gear according to claim 13, wherein the actuator is pivotable about the second pivot location to move in a plane generally perpendicular to the axis of the landing gear leg.

20. An aircraft having the aircraft landing gear according to claim 13.

\* \* \* \* \*